(12) United States Patent
Lanois et al.

(10) Patent No.: US 12,373,219 B2
(45) Date of Patent: Jul. 29, 2025

(54) REDUCED POWER CONSUMPTION PREDICTION USING PREDICTION TABLES

(71) Applicant: Arm Limited, Cambridge (GB)

(72) Inventors: Thibaut Elie Lanois, Peymeinade (FR); Guillaume Bolbenes, Vallauris (FR); Jonatan Christoffer Lövgren, Nice (FR)

(73) Assignee: Arm Limited, Cambridge (GB)

( * ) Notice: Subject to any disclaimer, the term of this patent is extended or adjusted under 35 U.S.C. 154(b) by 43 days.

(21) Appl. No.: 18/544,901

(22) Filed: Dec. 19, 2023

(65) Prior Publication Data
US 2025/0199815 A1   Jun. 19, 2025

(51) Int. Cl.
*G06F 9/38* (2018.01)
*G06F 1/3287* (2019.01)

(52) U.S. Cl.
CPC .......... *G06F 9/3844* (2013.01); *G06F 1/3287* (2013.01); *G06F 9/3806* (2013.01); *G06F 9/3848* (2013.01)

(58) Field of Classification Search
CPC ..... G06F 9/3844; G06F 9/3848; G06F 1/3287
See application file for complete search history.

(56) References Cited

U.S. PATENT DOCUMENTS

| | | |
|---|---|---|
| 11,138,014 B2 | 10/2021 | Ishii et al. |
| 2015/0331691 A1* | 11/2015 | Levitan ................. G06F 9/3848 712/240 |
| 2019/0196834 A1* | 6/2019 | Blasco ................ G06F 9/30189 |
| 2020/0065106 A1* | 2/2020 | Kalamatianos ......... G06F 11/34 |
| 2020/0285476 A1* | 9/2020 | Bolbenes ............ G06F 9/38585 |
| 2023/0385066 A1* | 11/2023 | Bouzguarrou ........ G06F 9/3848 |

* cited by examiner

*Primary Examiner* — Courtney P Spann
(74) *Attorney, Agent, or Firm* — NIXON & VANDERHYE P.C.

(57) ABSTRACT

An apparatus comprises a predictor to make a prediction based on a plurality of prediction tables. The plurality of prediction tables are looked up using table lookup information generated based on different lengths of input history information representing a path through program execution. The apparatus comprises circuitry to prevent a given portion of the input history information from differing with respect to a corresponding portion of the input history information used to make a preceding prediction, where the given portion is a portion which is not used to generate table lookup information for an active subset of the prediction tables.

20 Claims, 11 Drawing Sheets

REDUCED POWER CONSUMPTION PREDICTION USING PREDICTION TABLES

BACKGROUND

Technical Field

The present technique relates to the field of data processing. More particularly, the present technique relates to the provision of predictions during program execution based on prediction tables looked up based on history information.

Technical Background

A data processing apparatus may have a predictor for making predictions during execution of a program. For example the predictor may provide branch predictions for predicting outcomes of branch instructions, or provide data value predictions for predicting a value of data to be loaded from memory. This can help to improve performance by allowing subsequent actions (e.g. fetching of subsequent instructions beyond the branch instruction, or processing of an instruction dependent on the predicted data value) to begin before the actual outcome of the predicted event, action or value is determined.

SUMMARY

At least some examples of the present technique provide an apparatus, comprising:
history storage circuitry to store history information comprising a series of values corresponding to a series of processing events to represent a path through program execution;
a predictor to provide a prediction, the predictor comprising:
  a plurality of prediction tables to store prediction entries providing prediction information;
  lookup circuitry to perform table lookups in the plurality of prediction tables using table lookup information;
  lookup information generation circuitry to generate the table lookup information for the plurality of prediction tables based on different lengths of input history information, wherein the input history information is based on the history information stored in the history storage circuitry; and
  prediction generating circuitry to generate the prediction based on the prediction information in prediction entries identified by the lookup circuitry; and
input history selection circuitry to prevent a given portion of the input history information input into the lookup information generation circuitry for generating the table lookup information for a given prediction from differing with respect to a corresponding portion of the input history information input into the lookup information generation circuitry for generating the table lookup information for a preceding prediction; wherein
the table lookup information for looking up an active subset of the plurality of prediction tables is independent from the given portion of the input history information, and the table lookup information for looking up an inactive subset of the plurality of prediction tables is dependent on
the given portion of the input history information, and the table lookup information for looking up the inactive subset of the plurality of prediction tables is based on a longer length of input history information than the table lookup information for looking up the active subset of the plurality of prediction tables.

At least some examples provide computer-readable code for fabrication of the apparatus discussed above. The code may be provided on a computer-readable medium. The medium may be non-transitory.

At least some examples provide a system comprising:
the apparatus described above, implemented in at least one packaged chip;
at least one system component; and
a board,
wherein the at least one packaged chip and the at least one system component are assembled on the board.

At least some examples provide a chip-containing product comprising the system of described above assembled on a further board with at least one other product component.

At least some examples provide a method, comprising:
storing history information comprising a series of values corresponding to a series of processing events to represent a path taken through program execution;
generating table lookup information for looking up a plurality of prediction tables based on different lengths of input history information, the plurality of prediction tables storing prediction entries providing prediction information, wherein the input history information is based on the stored history information;
performing table lookups in the plurality of prediction tables using the table lookup information;
generating a prediction based on the prediction information in prediction entries identified by the table lookups; and
preventing a given portion of the input history information used for generating the table lookup information for a given prediction from differing with respect to a corresponding portion of the input history information used for generating the table lookup information for a preceding prediction; wherein
the table lookup information for looking up an active subset of the plurality of prediction tables is independent from the given portion of the input history information, and the table lookup information for looking up an inactive subset of the plurality of prediction tables is dependent on the given portion of the input history information; and
the table lookup information for looking up the inactive subset of the plurality of prediction tables is based on a longer length of input history information than the table lookup information for looking up the active subset of the plurality of prediction tables.

Further aspects, features and advantages of the present technique will be apparent from the following description of examples, which is to be read in conjunction with the accompanying drawings.

DESCRIPTION OF EXAMPLES

Figure 1:
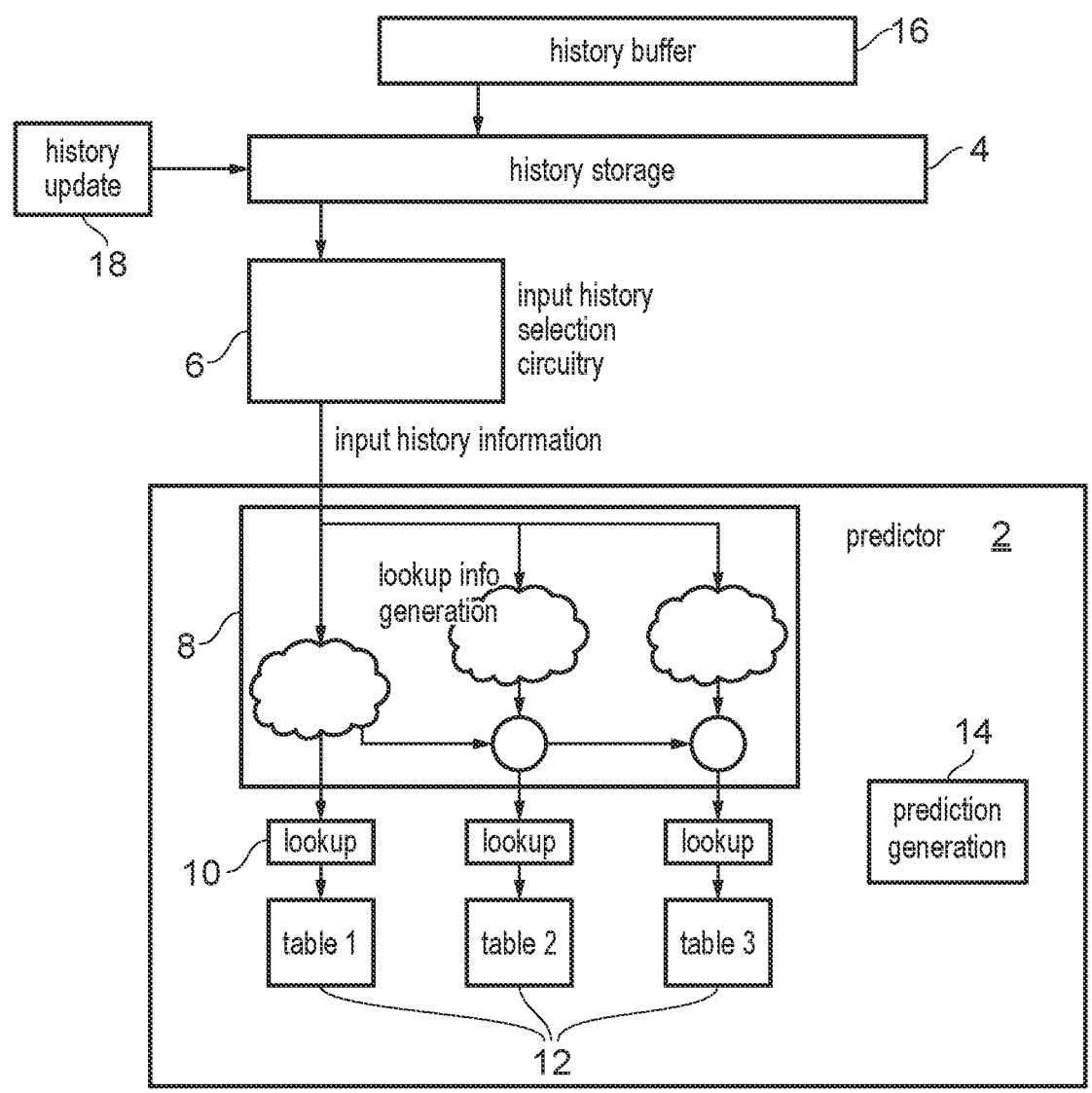
FIG. 1 shows a schematic diagram of an example predictor.

An apparatus has a predictor for providing a prediction. The prediction may represent a predicted outcome for a particular region of code, such as a predicted value. In some examples, the prediction may be a predicted branch outcome for a branch instruction. The predictor includes a number of prediction tables to store prediction entries providing prediction information. Lookup circuitry is provided to perform table lookups in the plurality of prediction tables using table lookup information, where the table lookup information is generated by lookup information generation circuitry based on different lengths of input history information. Prediction generating circuitry generates the prediction based on the prediction information provided in prediction entries identified by the lookup circuitry.

The table lookup information is generated based on history information stored in history storage circuitry, such as a history register, which stores a series of values representative of a series of processing events (for example, successive processing events) to represent a path through program execution. For example, the series of values may represent addresses of executed instructions, directions of taken branches, instruction addresses or target addresses of taken branches, and so on. A given stored value of the history information may be generated by performing a hash function on some input information such as an address (or any combination of the types of information described above) to provide a value representing that input information. By looking up prediction tables based on history information, the prediction can be made by taking into account a recent history of processing which may be correlated to the outcome of the prediction. For example, a branch outcome may be correlated with the path taken through program flow to arrive at the branch instruction, and therefore by making the prediction based on history information the prediction can be more accurate.

One reason for the relatively high levels of performance achieved in modern predictors is that prediction structures may include two or more distinct tables of prediction entries which can be looked up using table lookup information generated based on different lengths of input history, and the prediction for that block can be formed based on the looked up entries in each of those tables.

For a typical predictor, all of the prediction tables are treated as active prediction tables, and are looked up to make a prediction. However, often the prediction entries in some of those tables may not contribute to the prediction. For example, some of the looked up entries may be ignored in favour of other entries, or may output a value which does not contribute significantly to the overall prediction because an entry in another table may dominate. Hence, if all tables were active for each prediction, the power consumed in treating each of the prediction tables as active tables is wasted, and power can be saved by treating some prediction tables as inactive tables. Nevertheless, it may be desirable to continue to provide all of those tables, because there are predictions for which the increased number of tables can be useful to improve performance.

In particular, tables looked up using table lookup information generated based a longer length of history information may be less likely to contribute to the prediction than tables looked up based on shorter lengths of history information. This may be, for example, because longer history information has a wider range of possible values than shorter history information, and is therefore less likely to correspond to a valid entry in a table allocated to the table when previously encountering a similar pattern of history. Hence, in examples where certain tables are treated as inactive, it is the tables which are looked up with table lookup information generated based on a longer length of input history information that can be treated as inactive, and the tables which are looked up with table lookup information generated based on a shorter length of history information which are treated as active. It will of course be appreciated that in different situations the selection of active and inactive tables can vary, and in some examples there may be no prediction tables at all which are treated as inactive.

The inventors have recognised that a large portion of the power associated with treating each of the prediction tables as active arises during the generation of the table lookup information by the lookup information generation circuitry. Relatively complex logic may be used to generate table lookup information based on input history information. For example, a relatively short value for looking up a prediction table may be based on a much longer portion of history information, and therefore there may be several levels of logic for folding together bits of history information, such logic for example comprising a XOR tree.

The history information may constantly update as program execution progresses, and therefore the values input into the lookup information generation circuitry may constantly change. This changing of input values causes the logic in the lookup information generation circuitry to toggle (switch state from a particular logical value to another logical value), which is associated with dynamic power consumption.

The inventors have recognised that when certain prediction tables are treated as inactive tables, then the switching of a given portion of the history information input into the lookup information generation logic is associated with wasted power. In particular, the given portion is used to generate table lookup information for an inactive table, and is not used to generate table lookup information for an active table, meaning that the logic switching caused by changing values of this given portion of input history information is unnecessary, and the associated power consumption is wasted.

Hence, in the techniques discussed below, the apparatus comprises input history selection circuitry configured to prevent the given portion of input history information input into the lookup information generation circuitry for generating the table lookup information for a given prediction from differing with respect to a corresponding portion of the input history information input into the lookup information generation circuitry for generating the table lookup information for a preceding prediction. In this way, the unnecessary toggling of certain logic in the lookup information generation circuitry is prevented without affecting the generation of table lookup information which is used to lookup active tables, and therefore power consumption is reduced without affecting the prediction. It will be discussed below how preventing the given portion from changing can be carried out in numerous different ways.

It will be appreciated that in examples where there are no inactive prediction tables, the input history selection circuitry may determine that there is no given portion. However, the input history selection circuitry still provides the features of the present technique as it is still capable of preventing the given portion from differing with respect to a preceding value in cases where there is a given portion.

The input history selection circuitry may determine the active subset of prediction tables in different ways.

In some examples, the input history selection circuitry may determine the active subset of prediction tables based on filtering information associated with an address subject to the given prediction. For example, the determination of active prediction tables may be instruction-specific, and therefore the selection of active tables may be determined based on filtering information associated with an address of a given instruction to be subject to the prediction. The filtering information may be provided in different ways, for example it may be retrieved from an entry of a branch target buffer (BTB) corresponding to the address, a dedicated filtering information structure, an instruction cache, and so on.

In some examples, the input history selection circuitry may be configured to also, or alternatively, determine the active subset of prediction tables based on global table activity information indicating active prediction tables independent from an address which is subject to the given prediction. For example, there may be a global table activity register indicating which of the plurality of prediction tables belong to the active subset for each prediction. Indicating the active subset globally may be particularly useful in cases where prediction tables are trained from an initial state, and where tables looked up based on longer histories take longer to train, or are enabled later than, tables looked up based on shorter lengths of history information.

As mentioned above, there are many different ways that the given portion can be prevented from differing between two instructions.

In some examples, the input history selection circuitry comprises power gating logic configured to disable updates for a portion of the history storage circuitry corresponding to the given portion of the input history information. That is, updates may be prevented for the bits of the history storage circuitry used to provide or derive the given portion of the input history information. This could involve preventing any updates for the given portion of the history storage circuitry (e.g., in the case where tables are globally disabled) such that the bits remain at their initialized value (e.g., 0) over a long period of time. This could also involve preventing updates for the given portion for a single prediction, such that the given portion of the history storage circuitry retains its previous values representative of previous history information. In both cases, by preventing the given portion of the history storage circuitry from being updated, then the values input into the lookup information generation circuitry from the given portion remain the same, reducing toggling of the lookup information generation logic, and therefore reducing dynamic power consumption. Preventing updating of the given portion of the history storage circuitry also has the extra benefit of reducing power consumption of the history storage circuitry, because the bits of the history storage circuitry are also prevented from toggling.

In some examples, the history storage circuitry is provided by a shift register. Responsive to a history information update inputting more recent history information at a newer end of the shift register (e.g., the least or most significant bit position), the previous contents of the shift register are moved towards an older end of the shift register (the opposite end from the newer end). In some examples, where tables are each looked up based on the most recent history information (of varying lengths), the given portion (which is not used to look up the tables looked up based on the shortest history information) is the oldest portion of the history information. Hence, the power gating logic may be configured to disable updates for an oldest portion of the shift register. Of course, depending on the number of active tables the size of the disabled portion may change.

In some examples, the power gating logic is responsive to a prediction table activation event to re-enable updates for at least a part of the disabled portion, wherein the prediction table activation event is an event which triggers activation of a previously inactive prediction table. The activation event may be, for example, a value changing in a global activation register to indicate that a table should be switched from inactive to active. The activation event may occur in response to (or comprise) a determination that a previous prediction was incorrect, and therefore a determination that future predictions require a greater accuracy of prediction which may be provided by activating an additional table. Hence, utilisation of the history storage circuitry may be controlled by the power gating logic to balance power consumption against prediction accuracy.

Some examples may comprise history storage restoration circuitry responsive to the prediction table activation event to restore history information in the disabled portion from a history buffer. The history buffer may keep a longer record of history than the history storage circuitry, and may keep track of the "commit point" in the history, which marks the boundary between older committed instructions whose outcomes are known to be resolved as correct and younger instructions which may still be speculative. The history buffer can be used to rebuild the history information in the history storage circuitry in response to determining that part of the history information was based on an incorrect prediction. Following the prediction table activation event, there is a newly active portion of the history storage circuitry which stores no valid history information, and hence the history buffer (which might normally be provided solely for rebuilding after mispredictions) may be reused to provide history information for the re-enabled portion. In some examples, the prediction table activation event may commonly occur on a misprediction (when the number of tables is increased following a misprediction), meaning that the history buffer may be accessed in any case on the prediction table activation event to rebuild the previously active part of the history storage circuitry, so also using the history buffer to restore history information into the previously disabled portion may have a reduced overhead. Hence, while one might think that disabling updates to the disabled portion of the history storage could be a disadvantage as it could risk inaccuracy after a new table is activated (when there would be no previous history available in the history storage for the disabled portion), in practice the restoration of history from the history buffer at the point when new tables are activated can also restore history to a newly enabled portion of the history storage corresponding to a newly activated prediction table, so that this disadvantage does not in fact happen in practice.

Whilst preventing updates of the history storage circuitry is one option for preventing the given portion from differing between predictions, this option may not be preferred for certain types of history storage structure, such as circular buffers for which the given portion of the history information does not remain in one place in the history storage. Hence, in some examples, the input history selection circuitry may be configured to inject modified history information into the input history information downstream of the history storage circuitry to prevent the given portion differing between the given prediction and the preceding prediction. Then, regardless of the values stored in the history storage circuitry, the lookup information generation circuitry can be prevented from toggling because the values being input into the lookup information generation circuitry are prevented from differing.

For example, in at least one mode the modified history information injected into the input history information may have a predetermined fixed value, such as zero. By injecting a fixed value for the given portion over a series of predictions, then the lookup information generating logic can be prevented from toggling because the input values into the logic remain the same (for the given portion).

There are some examples where injecting fixed values for a given prediction could lead to toggling. For example, if the given portion previously input into the lookup information generation circuitry was a portion of history information (rather than initialized or injected fixed values), e.g., if the given portion has been determined on the basis of filtering information for a particular prediction rather than global information, then there is a chance that injecting fixed values actually causes toggling of the lookup information generation circuitry.

Therefore, some examples may provide snapshot circuitry to provide at least one snapshot of the history information corresponding to a previous point in program flow. In some examples the snapshot circuitry may provide a plurality of snapshots of the history information corresponding to respective points in program flow (for example, successive points in program flow). The snapshot circuitry may, for example, provide delayed copies of the history information compared to the copy stored in the history storage circuitry, delayed by increasing numbers of updates. The modified history information provided by the input history selection circuitry may comprise a snapshot of the given portion of the history information having the same value that the given portion had for the preceding prediction. In other words, rather than injecting a predetermined value (such as all zeros), the input selection circuitry may inject the same values that were input into the lookup information generating circuitry, a copy of which has been retained by the snapshot circuitry. This prevents toggling of the relevant portion of the lookup information generating circuitry regardless of the actual values of the given portion, and therefore supports reduction of power consumption even in examples for which a given prediction table may be inactive for a single instruction.

In some examples, the apparatus comprises a first predictor to generate a first prediction in a first number of pipeline stages, based on information derived from a first snapshot of the history information, and a second predictor to generate a second prediction in a second number of pipeline stages different to the first number, based on information derived from a second snapshot of the history information corresponding to a different point in program flow to the first snapshot. The first and second predictors are not limited to any particular type of predictor. Because the first and second predictors generate their respective predictions in different numbers of pipeline stages, but share the same history storage circuitry for providing their respective history information, it can be useful to provide the first and second predictors with different views of the history information in the history storage circuitry. Therefore, the snapshot circuitry may be provided to ensure consistent predictions by providing to the first and second predictors snapshots, delayed by different amounts, which represent the history information at the same time. The snapshot circuitry may already be provided for this purpose, and hence the reuse of the snapshot circuitry to provide the modified history information for injection into the input history information may have a reduced overhead.

In some examples, for a given prediction table the lookup information generation circuitry is configured to map N bits of input history information to M bits of table lookup information for the given prediction table, where $M<N$. It will be appreciated that N may differ, as table lookup information for looking up different tables is based on different lengths of history information. As discussed above, the operation performed to provide the table lookup information is not particularly limited, and may be implemented by a series of XOR operations between pairs of bits.

Although the type of predictor is not particularly limited, in some examples the predictor is a branch predictor to provide a predicted branch instruction outcome for a current block of at least one instruction. For example, the predictor may provide a prediction of whether one or more branch instructions included in the block are taken or not taken.

The information provided by the plurality of prediction tables is not particularly limited. In some examples, the predictor may be a perceptron-based predictor and the plurality of prediction tables may be perceptron weight tables looked up based on different lengths of history information. Each perceptron weight table may provide a weight value associated with the current prediction. The prediction generating circuitry may generate the prediction by adding the weights obtained from prediction entries looked up in each of the active subset of prediction tables.

At first glance, one might expect that for a perceptron-based predictor there is no benefit to disabling some of the prediction tables as the prediction is formed by adding the weights from all of the tables, unlike certain predictors where the prediction is formed from a single entry in a single table (see the discussion of TAGE predictors below). Hence, it may be surprising that the present approach is useful for a perceptron-based predictor. However, it is recognised that although the weights from all the tables may be added to form the prediction, in practice some of the weights may have relatively low absolute values which do not significantly contribute to the overall prediction, and the prediction result may be dominated by the contribution made by weights in other tables. Hence, at the time of updating the weights in the perceptron weight tables, table update circuitry could detect that a given weight in a given table will not contribute to the overall prediction and could then indicate that that prediction table should be treated as inactive on a future prediction, so that power can be saved.

In other examples, the predictor is a tagged-geometric (TAGE) predictor, and the plurality of prediction tables are TAGE tables which are indexed based on different lengths of history information representing paths through program execution of different lengths to arrive at a particular point in program flow. When the table lookup hits in at least two TAGE tables, the prediction generating circuitry may be configured to generate the prediction based on a hit prediction entry in the TAGE table looked up based on table lookup information generated based on the longest length of input history information. That is, a TAGE predictor may preferentially select a branch prediction based on an entry hit in a table indexed based on a longer history information, but if no hit is identified in the longer history tables then a prediction from a table indexed based on a shorter length of history can be used instead. This approach can provide high performance because TAGE predictors can remove the need to compromise between shorter history (which is more likely to hit against an entry but for which the prediction is less accurate) and longer history (which is less likely to hit against an entry but if it does then the prediction is more accurate) as both short and long history can be used to look up different tables, and TAGE-based predictors are one of the most accurate branch prediction schemes currently known. However, they do result in many copies of table lookup information being generated for the respective TAGE tables and often much of the lookup information generation may be unnecessary because the prediction ends up being made based on an entry in a different table. Also, in practice the tables corresponding to longer history tend to be allocated with entries in response to detecting mispredictions based on tables corresponding to shorter history, so in practice some of the longer-history tables may be inactive if shorter-history tables provided correct predictions. TAGE predictors therefore present an example where significant amount of power can be saved by deactivating some tables and not toggling input history information used to generate the lookup information for inactive tables.

The history information in the history storage circuitry may be updated in response to a range of events occurring during program execution. However, a particularly efficient apparatus is provided by updating the history information in response to detecting that a branch instruction is treated as taken. Tracking taken branches identifies the major discontinuities in program flow, and therefore provides history information which is very characteristic of a path through program execution, without requiring overly frequent updates to the history information (compared to, for example, if the history information were updated every branch instruction regardless of direction).

In some examples, a value of the series of values of the history information is generated in dependence on at least one of an instruction address of a branch instruction, and a target address of a branch instruction. As discussed above, branch instructions provide a particularly effective way of tracking a path through program execution.

FIG. 1 shows an example of a predictor 2, including lookup information generation circuitry 8, lookup circuitry 10, a plurality of prediction tables 12, and prediction generation circuitry 14. The prediction tables 12 each include prediction entries storing prediction information. Different types of predictor could record different types of information within each prediction entry, so the precise information indicated can vary. For example the prediction information could include a counter which is incremented and decremented in response to actual outcomes detected in an execute stage later than a prediction stage of a processing pipeline, and the counters may be compared with a threshold to determine whether to make a given prediction one way or another. Other approaches as discussed below could use entries which specify prediction weights which are to be added together to form the overall prediction.

The lookup information generating circuitry 8 receives a number of pieces of input information, for example a program counter address representing an address of a current instruction to be subject to a prediction, and input history information (derived from history information stored in history storage 4) which comprises a series of values corresponding to a series of processing events to represent a path through program execution which led to the current instruction being reached. The history information may be stored in history storage 4, and may be updated throughout program execution by history update circuitry 18 so that the history information continues to reflect the path taken to arrive at the current instruction. In one example, the history information could be based on a history register 4 which captures the taken/not taken outcomes of the most recently executed N branches, where N is some arbitrary integer chosen by the micro-architecture designer. Hence, each time a branch is executed, a bit indicating whether its outcome is taken or not taken may be shifted in at one end of the history register 4 by history update circuitry 18, with the outcome of the least recently executed branch being shifted out of the register at the other end, and outcomes of more recently executed branches all shifting up one position within the register. In other examples the history information may only be updated by the history update circuitry 18 on taken branches, and the values representative of the history may be based on addresses of the taken branch instructions and/or the target addresses of said taken branch instructions. Regardless of the particular form of the stored history, a series of history values which depends on the path taken in program flow to reach the current instruction can be maintained, which can help to distinguish different routes by which the same block of instructions may be reached through different program flow outcomes. This can help to ensure that different predictions can be made for the different scenarios in which the same instruction address may be encountered, to try to predict data-dependent branch decisions for example. In some examples discussed below the history register 4 may not be a true shift register, and could for example be provided as a circular buffer. Some implementations may use a combination of types of history derived from different pieces of information tracking recent history of program flow. A history buffer 16 is provided to rebuild the history information in response to flushes which may be caused by mispredictions leading to the history information including history based on an incorrect prediction.

To make a prediction, a plurality of tables 12 are looked up by lookup circuitry 10 based on table lookup information generated by the lookup information generating circuitry 8 based on different lengths of input history information. Prediction generating circuitry 14 combines the information from the looked up entries in the various tables 12 to form the overall predicted outcome.

Each table corresponds to a different length of history information. Looking up tables based on different lengths of history can lead to improved predictions, because different lengths of path through program execution can be considered. In some examples, the use of different lengths of history information means that the predictor does not have to compromise between accuracy (generally provided by longer histories) and the likelihood of hitting against a prediction entry (which is generally higher with shorter histories), as both can be provided by different prediction tables.

Figure 2:
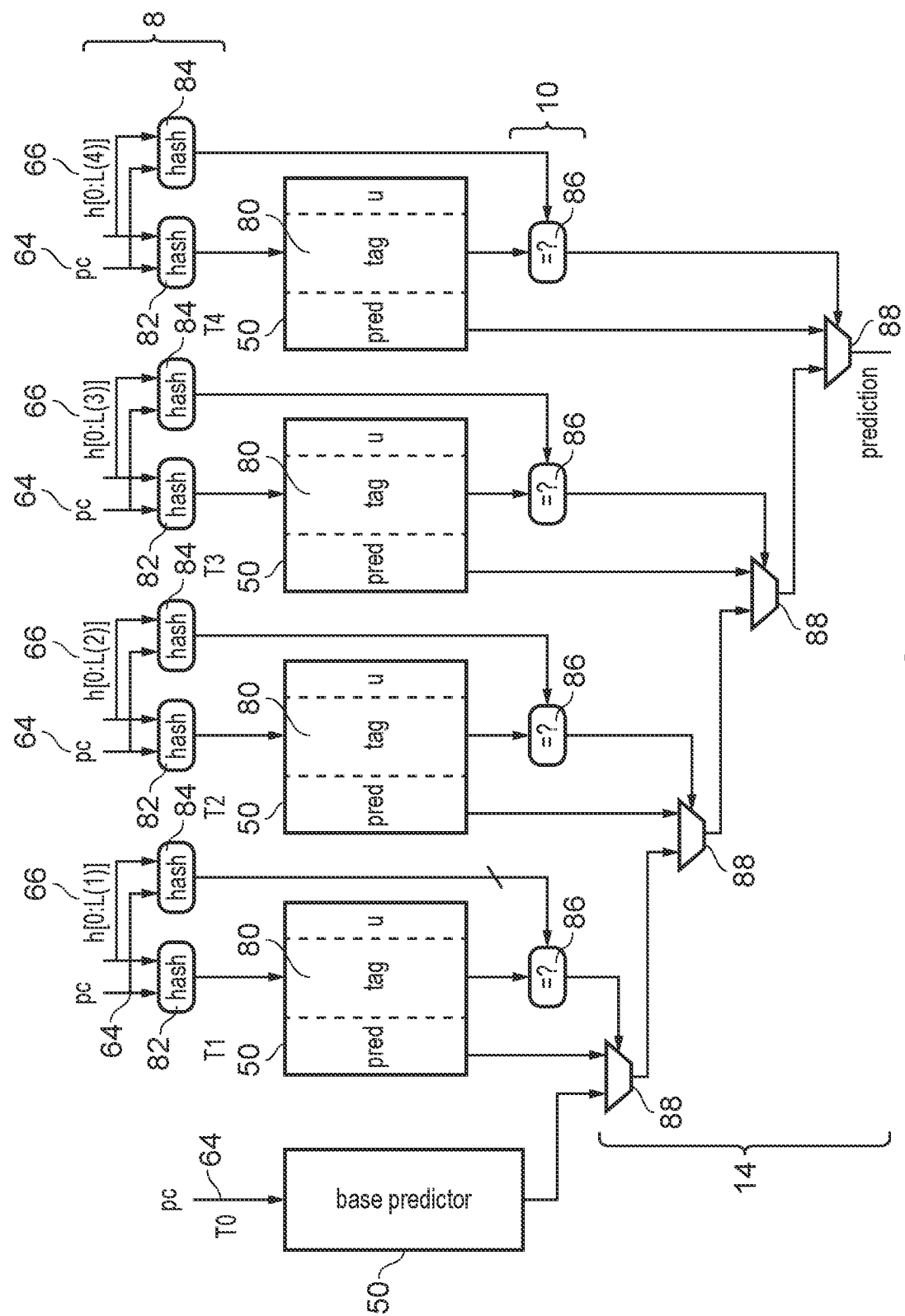
FIG. 2 shows an example where the predictor is a TAGE predictor.

FIG. 2 shows an example of a tagged-geometric (TAGE) predictor, which is a particular type of predictor which may be used in examples of the present technique.

The prediction tables 50 include a base prediction table T0 and a number of tagged-geometric (TAGE) tables T1 to T4. While this example shows 4 TAGE tables for conciseness, it will be appreciated that the TAGE predictors could be provided with a larger number of tables if desired, e.g. 8 or 16. The base predictor T0 is looked up (e.g. indexed/tagged) based on the program counter PC alone, while the TAGE tables T1 to T4 are looked up based on a hash value generated by applying a hash function to the program counter (PC) 64 and successively increasing lengths of history information 66, so that T1 uses a shorter sequence of history information compared to T2, T2 uses a shorter sequence of history information compared to T3, and so on. In this example T4 is the table which uses the longest sequence of history information. Each prediction entry specifies a prediction counter ("pred"), for example a 2-bit counter which provides a bimodal indication of whether the prediction is to be taken or not taken (e.g. counter values 11, 10, 00, 01 may respectively indicate predictions of: strongly predicted taken, weakly predicted taken, weakly predicted not taken, and strongly predicted not taken), where taken is a prediction in one direction and not taken is a prediction in the other direction, with the terminology referring to predictions for branch outcomes although it will be appreciated that the technique is not so limited. Each entry also specifies a tag value 80 which is compared with a tag hash generated from the input lookup information for that table to detect whether the entry corresponds to the current block being looked up (the tag distinguishes between multiple blocks whose index hash values alias onto the same entry of the table). The lookup information generation circuitry 8 includes index hashing circuitry 82 for generating, based on the input lookup information, an index hash for indexing into a selected entry of the table, and tag hashing circuitry 84 for generating, based on the input lookup information, a tag hash value to be written to a newly allocated entry or for comparing with an existing entry's tag value 80 on a lookup, and the lookup circuitry 10 comprises comparison circuitry 86 for comparing the tag value 80 read out from a looked up entry with the calculated tag hash generated by the tag hashing circuitry 84 to determine whether a hit has been detected.

For a TAGE predictor, the prediction generation circuitry 14 comprises a cascaded sequence of selection multiplexers 88 which select between the alternative predictions returned by any of the prediction tables 50 which generate a hit. The base predictor 50 may always be considered to generate a hit, and is used as a fall-back predictor in case none of the other TAGE tables generate a hit (a hit occurs when the tag in the looked up entry matches the tag hash generated based on the indexing information). The cascaded multiplexers are such that if the table T4 indexed with the longest sequence of history generates a hit then its prediction will be output as the prediction result, but if it misses then if the preceding table T3 generates a hit then the T3 prediction will be output as the overall prediction for the current block, and so on, so that the prediction which gets selected is the prediction output by the table (among those tables which generated a hit) which corresponds to the longest sequence of history considered in the indexing. That is, any tables which miss are excluded from the selection, and among the remaining tables the one with the longest sequence of history in its indexing information is selected, and if none of the TAGE tables T1 to T4 generate a hit then the base predictor T0 is selected.

This approach is extremely useful for providing high performance because a single table indexed with a fixed length of history has to trade off the accuracy of predictions against the likelihood of lookups hitting in the table. A table indexed with a relatively short sequence of history may be more likely to generate a hit, because it is more likely that the recently seen history leading to the current state is the same as a previously seen sequence of history for which an entry is recorded in the table, but as the shorter sequence of history cannot distinguish as precisely between the different routes by which the program flow may have reached the current state, it is more likely that the prediction indicated in the hit entry may be incorrect. On the other hand, a table which is indexed based on the longest sequence of history (e.g., T4) can be extremely useful for predicting harder to predict branches which need to delve further into the past in terms of exploring the history so that that the pattern of program execution which led to that branch can be characterised and an accurate prediction made, however, it is less likely on subsequent occasions that the longer sequence of history will exactly match the sequence of history leading up to the current state and so the hit rate is lower in a table indexed based on a longer sequence of history. By providing a range of tables with different lengths of history used for table lookups, this can balance these factors so that while the hardest predictions can be successfully predicted with the longer table, other easier to predict branches which do not require the full prediction capability can be predicted using one of the earlier tables indexed based on shorter history so that it is more likely that a hit will be detected on a prediction lookup, thus increasing the percentage of predictions for which a successful prediction can be made and therefore improving prediction accuracy and performance. Hence, TAGE predictors are one of the most accurate predictors known.

Figure 3:
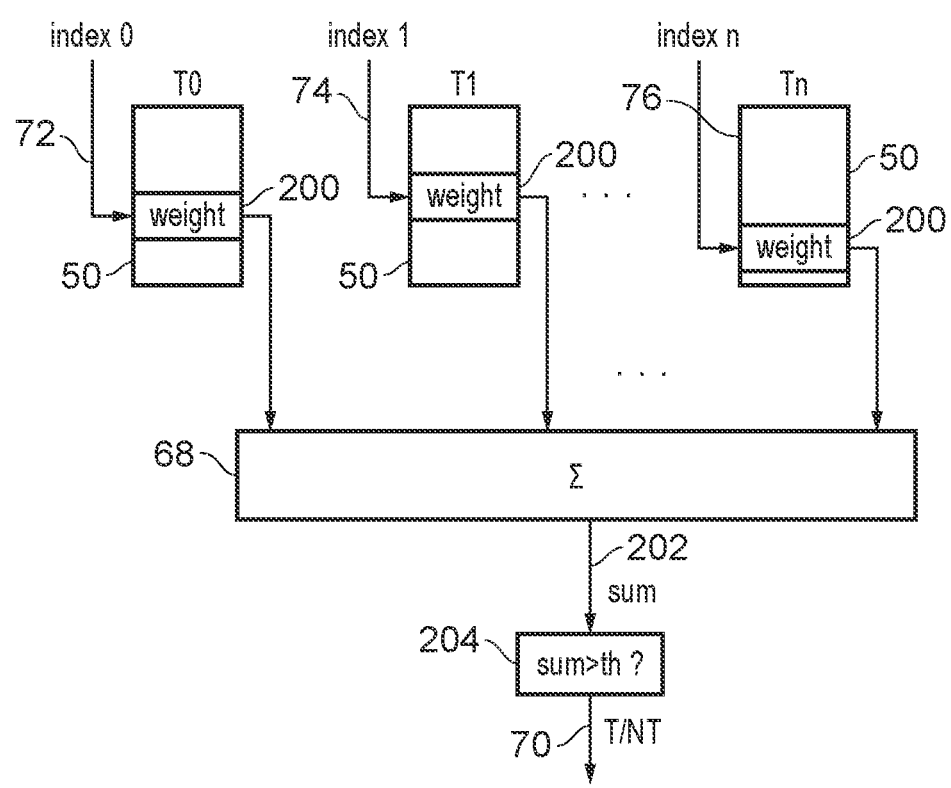
FIG. 3 shows an example where the predictor is a perceptron predictor.

The present techniques are not limited to TAGE predictors, however. FIG. 3 shows a different type of predictor, called a perceptron predictor. Similar to the TAGE predictor the perceptron predictor includes a number of prediction tables 50 with entries looked up based on different indexing information 72, 74, 76 derived from input history information corresponding to different lengths of history. For conciseness, in FIG. 3 the lookup information generating circuitry 8 is not shown but it may generate the respective sets of indexing information in a similar way to described above, based on hashing different lengths of history information. However, unlike the TAGE predictor, for the perceptron predictor the prediction entries are untagged (so each lookup generates a hit by definition) and each prediction entry provides a weight value 200, and the weights read from the looked up entries in each of the tables 50 are added together by the prediction generating circuitry 68 to produce a sum value 202 which can then be compared with a threshold by comparison circuitry 204 to provide a predicted outcome 70 shown in FIG. 3 as a predicted branch outcome indicating whether a branch instruction is predicted taken or not taken. Hence, rather than making a cascaded selection between the alternative predictions provided by each table, the perceptron adds the weights from each of the tables together and then the total of all of the weights indicates the prediction.

In the techniques described above, predictions are made on the basis of a plurality of prediction tables. For some predictors, all of the prediction tables are treated as active prediction tables, and are used to make a prediction. However, it is recognised that often the prediction entries in some of those tables may not contribute to the prediction. In the TAGE example, a table which is looked up on longer history may not contribute to the prediction if there is no entry in the table to hit against the lookup. This may happen, for example, when predictions are able to be accurately made using the shorter history tables, and therefore the tables looked up based on longer history are not updated with prediction entries. The perceptron approach would appear to rely on all of the tables for every prediction and so it may be surprising that some tables may not contribute to the prediction. However, if the weight from one table is much larger than the weight from another table then the table providing the smaller weight value may not contribute significantly to the result, in that regardless of whether that table is looked up, the sum value 202 may still fall the same side of the threshold as if that table's weight was included in the sum performed by the prediction generating circuitry 68.

In particular, tables looked up using table lookup information generated based a longer length of history information may be less likely to contribute to the prediction than tables looked up based on shorter lengths of history information. Therefore, the inventors have realised that power can be saved by treating certain tables as inactive.

The inventors have recognised that a large portion of the power associated with treating each of the prediction tables as active arises during the generation of the table lookup information by the lookup information generation circuitry 8, and therefore a large power saving associated with treating certain prediction tables as inactive may arise within the lookup information generating circuitry 8.

As the history register 4 is updated, the values on each input line into the lookup information generation circuitry 8 may change, causing logic switching in the lookup information generation circuitry 8. However, power is wasted by allowing switching of the logic which is only responsible for generating lookup information for the inactive tables, and which is not responsible for generating lookup information for the active tables. Therefore, input history selection circuitry 6 is provided to prevent a given portion of input history information input into the lookup information generation circuitry for generating the table lookup information for a given prediction from differing with respect to a corresponding portion of the input history information input into the lookup information generation circuitry for generating the table lookup information for a preceding prediction. The given portion is the portion of input history which is used to generate table lookup information for looking up an inactive subset of the plurality of prediction tables, and which is not used to generate table lookup information for looking up an active subset of the plurality of prediction tables.

In other words, the input history selection circuitry 6 prevents switching on the input lines into the lookup information generation circuitry 8 which do not affect the generation of lookup information for looking up the active tables, and by preventing such switching prevents unnecessary switching of logic within the lookup information generating circuitry 8.

The determination of which prediction tables are to be treated as active and inactive prediction tables, which determines the "given portion" of the input history information, can be made in several ways.

In some examples, a register or other storage location may provide a global indication of the selection of active tables, which is to be applied to all instructions. For example, the higher level prediction tables could be disabled completely until it is determined that they are needed to provide increased accuracy for a currently executing program. The inactive tables may be power gated to reduce their power consumption until needed, for example.

In other examples, filtering information could be provided on a per-prediction basis, disabling certain prediction tables for a particular prediction. For example, it may be determined that a particular selection of prediction tables are not required to make a prediction in respect of a particular instruction (for example, a previous prediction of the same instruction may have been successfully made without use of certain tables which in later predictions can be treated as inactive). This can save power for a particular instruction as discussed in the present application, even if the inactive prediction tables are not able to be completely turned off.

Figure 4:
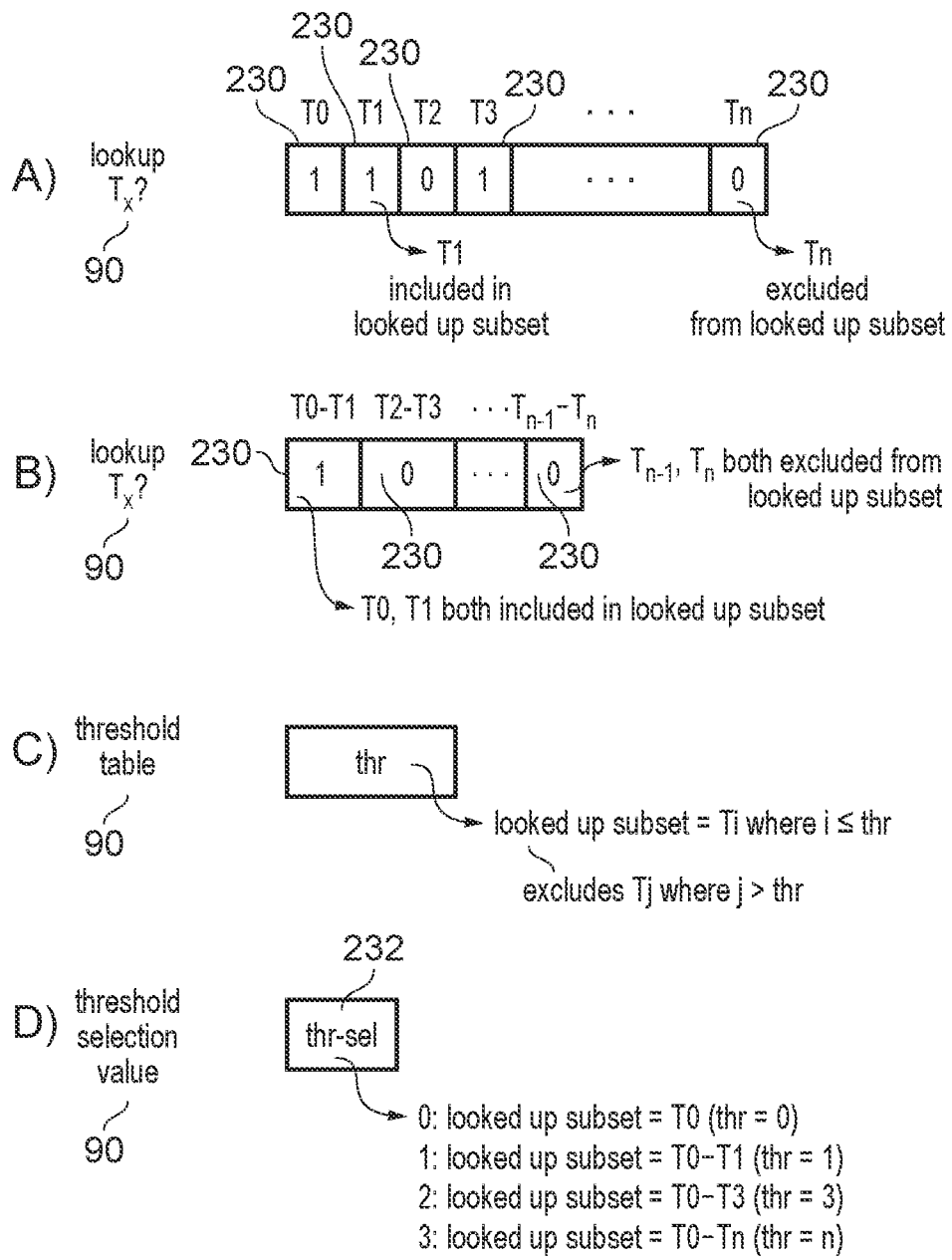
FIG. 4 illustrates a number of examples of representing filtering information.

In either case, FIG. 4 provides examples of encodings of filtering information which may be used to determine a selection of active prediction tables.

In example A the lookup filtering information comprises a precise bitmap with individual table subset membership indications (bit flags) 230 for each of the tables 12 of the predictor, and so in this case a given table can be excluded from the active subset of tables regardless of whether other tables also should be excluded or included.

However, in another example as shown in part B of FIG. 4, the table subset membership indications 230 may be grouped so that each indication 230 corresponds to a group of tables, in this example two adjacent tables. For example, the first flag represents where the tables T0 and T1 can be considered active/inactive, the second flag represents where the tables T2 and T3 can be considered active/inactive, and so on. Note that while for the perceptron example it may be desirable to support an encoding to enable any of the tables to be part of the inactive subset, for the TAGE example the base predictor 50 need not have any group or individual subset membership bit 230 provided because it may always be active in case there are misses in all of the higher tables.

Hence, with the approach in example B, then even if table T2 could be excluded from the active subset of tables, T2 may still need to be considered active if table T3 includes a useful entry which cannot be excluded. Hence there may be a trade-off between the maintenance and storage overhead of precisely tracking the filtering information for the different tables and the power that can be saved by treating certain tables as inactive. Some designers may find that the approach in example B may be more efficient overall when considering the storage overhead for the filtering information in each entry of a structure provided on a per-prediction basis.

While FIG. 4 shows examples where a bit flag of 1 indicates that the corresponding table or group of tables is active and a bit flag of 0 indicates that the corresponding table or group of tables is inactive, other approaches could use the opposite encoding. Also it will be appreciated that in the group example of part B, flags could be provided for groups of more than two tables. Also, it is not essential for all of the flags 230 to correspond to the same size group of tables.

As shown in part C of FIG. 4, another approach can be that the lookup filtering information 90 represents a threshold. In this case the threshold indicates a certain table number identifying a particular table acting as the threshold table, tables with lower table numbers (shorter history) could be included in the active subset, and tables with higher table numbers (longer history) could be in the inactive subset (of course other approaches may allocate table numbers the opposite way around, with the lowest table numbers representing tables indexed with longer history). In general, it may be desirable for the inactive tables to be the tables which index their entries based on history information of a longer length than the threshold length table indicated by the threshold table value 90.

The example of part C represents the threshold as a binary numeric value which can uniquely identify any one of the tables as the threshold table, but this is not essential. FIG. 4, part D, shows a different example where the threshold indicating value 232 has fewer bits than the binary value which would be needed to uniquely represent each different table. In this case, some alternative encodings of the threshold indicating value 232 could be selected to represent certain tables as the threshold table, for example with a 2-bit encoding the values of 0, 1, 2, and 3 could be assumed to represent thresholds of T0, T1, T3 and Tn respectively to indicate different sizes of the looked up subset, and this saves bit space in the lookup filtering information by avoiding encodings for representing other possible thresholds. It may be that the overhead of precisely indicating the threshold at every boundary between tables is not justified, and it is enough to have some broad classes of lookup filtering at a few selected points. Hence, with this example if a certain prediction requires tables T0, T1, T2 to predict it, then although T3 is not needed, to ensure that the useful tables are looked up then the threshold selection value of 2 would be used and although this means that a redundant generation of lookup information for table T3 is still performed, it still saves power by avoiding the generation of lookup information for tables T4 to Tn.

Hence, it will be appreciated that there are a wide variety of ways in which the filtering information could be represented for a given prediction. There are also a variety of ways in which the given portion of the input history information can be prevented from differing between predictions.

Figure 5:
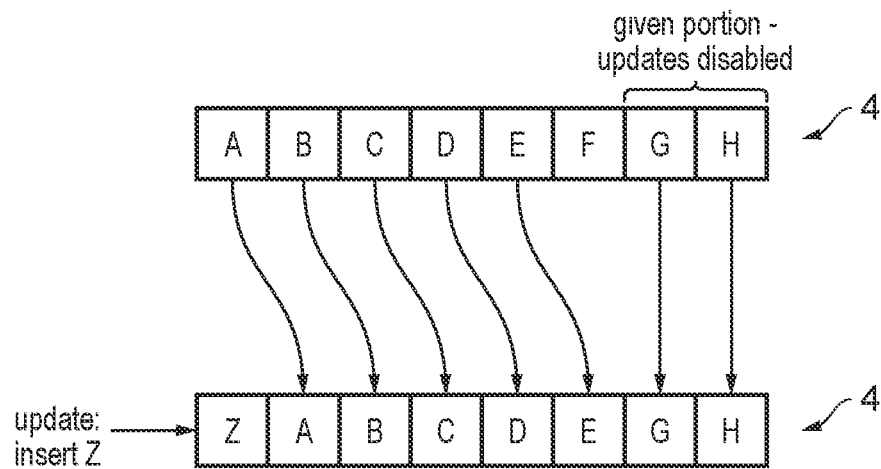
FIG. 5 illustrates an example of preventing updates for a given portion of history storage circuitry.

FIG. 5 illustrates an example of history storage circuitry 4 provided as a shift register. FIG. 5 shows the shift register 4 at two different times, before and after an update in which a new value representing a processing event ("Z") is inserted into the history register.

Values representing a series of processing events are represented in the shift register 4 as letters, which are each understood to represent a number of bits representative of a processing event. For example, each value ("A", "B", etc.) may comprise a hash of a branch instruction address and/or a branch target address, etc. Updates are inserted into the shift register 4 at the left-hand side of the schematic representation of FIG. 5, which could be representative of a most or least significant bit position. Hence, the series of values shown in the top part of FIG. 5 has "H" as the oldest value and "A" as the most recent value.

As shown between the top and bottom halves of FIG. 5, following an update to the history information, the history values are shifted towards an older end of the shift register to make room for the newest value at the newest end of the shift register. In this way, the history register 4 maintains an up-to-date representation of the path taken through processing to reach a current instruction.

Each of the bits of the history register may be connected to an input line into the lookup information generation circuitry 8, such that when the values shift many input lines switch values causing toggling in the lookup information generation circuitry (the toggling generating updated table lookup information). As discussed above, some of the input history may not be used to lookup an active table. For example, the portion of the history register 4 comprising values "G" and "H" may be used to generate lookup information which is only used for looking up inactive tables, and therefore does not contribute to a prediction.

Hence, while in the case where the toggling prevention is not implemented, items F and G would have been shifted up into the final two entries of the shift register, to prevent toggling of the lookup information generating circuitry 8 in the example of FIG. 5, the input history selection circuitry 6 is configured to prevent updates of the given portion. Therefore, when new history information is input into the shift register 4, the new value Z is shifted in and the values A-E are shifted down the register, but values of the given portion, G and H, are kept the same. This means that the input lines connected to G and H do not change values, and the downstream logic connected to those lines does not toggle. Hence, one way that the input history selection circuitry can prevent the given portion of the input history information from differing between predictions is by preventing updates to the given portion of the history storage circuitry 4.

Preventing updates to the history storage circuitry 4 also saves power by reducing the dynamic power consumption of the history storage circuitry 4, as well as reducing toggling in the lookup information generation circuitry 8.

In some examples the given portion may be prevented in other ways, which may be better suited to systems having history information stored in structures other than a shift register (e.g. using a circular buffer, for which entries remain static once allocated rather than being shifted from entry to entry, and a pointer is used to track the insertion point at which a new entry is to be inserted).

Figure 6:
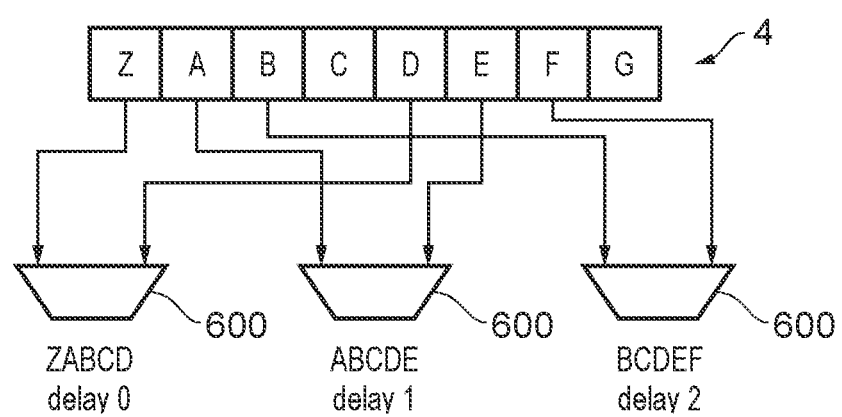
FIG. 6 illustrates examples of snapshot circuitry.

FIG. 6 shows an example of a history register 4, and a plurality of instances of snapshot circuitry 600.

Some systems may comprise two or more predictors which take different numbers of cycles to make a prediction. So that the predictors can share a single instance of the history storage 4, but the predictions resulting from each predictor can be based on the same view of the history information, even when considering the different numbers of cycles from input to output of the predictors, the apparatus may already comprise snapshot circuitry 600 to provide copies of history information corresponding to respective points in program flow. In FIG. 6, three copies of snapshot circuitry are shown to provide three copies of the history information at three successive points in program flow. Each instance of snapshot circuitry 600 is provided by a multiplexer taking as inputs a section of the history register 4 (it will be appreciated that only the end connections for each section are shown for clarity).

As shown in FIG. 6, a first instance of snapshot circuitry may provide a copy of the history information with no delay and therefore may output a most recent section of the history register ("ZABCD"). A second instance of snapshot circuitry may provide a copy of the history information delayed by one update, before Z had been added, and therefore output "ABCDE". As shown in FIG. 6 this may be due to a different configuration of connections to bits in the history storage circuitry 4. Similarly, a third instance of snapshot circuitry may provide a copy of history information which is even further delayed, "BCDEF".

Figure 7:
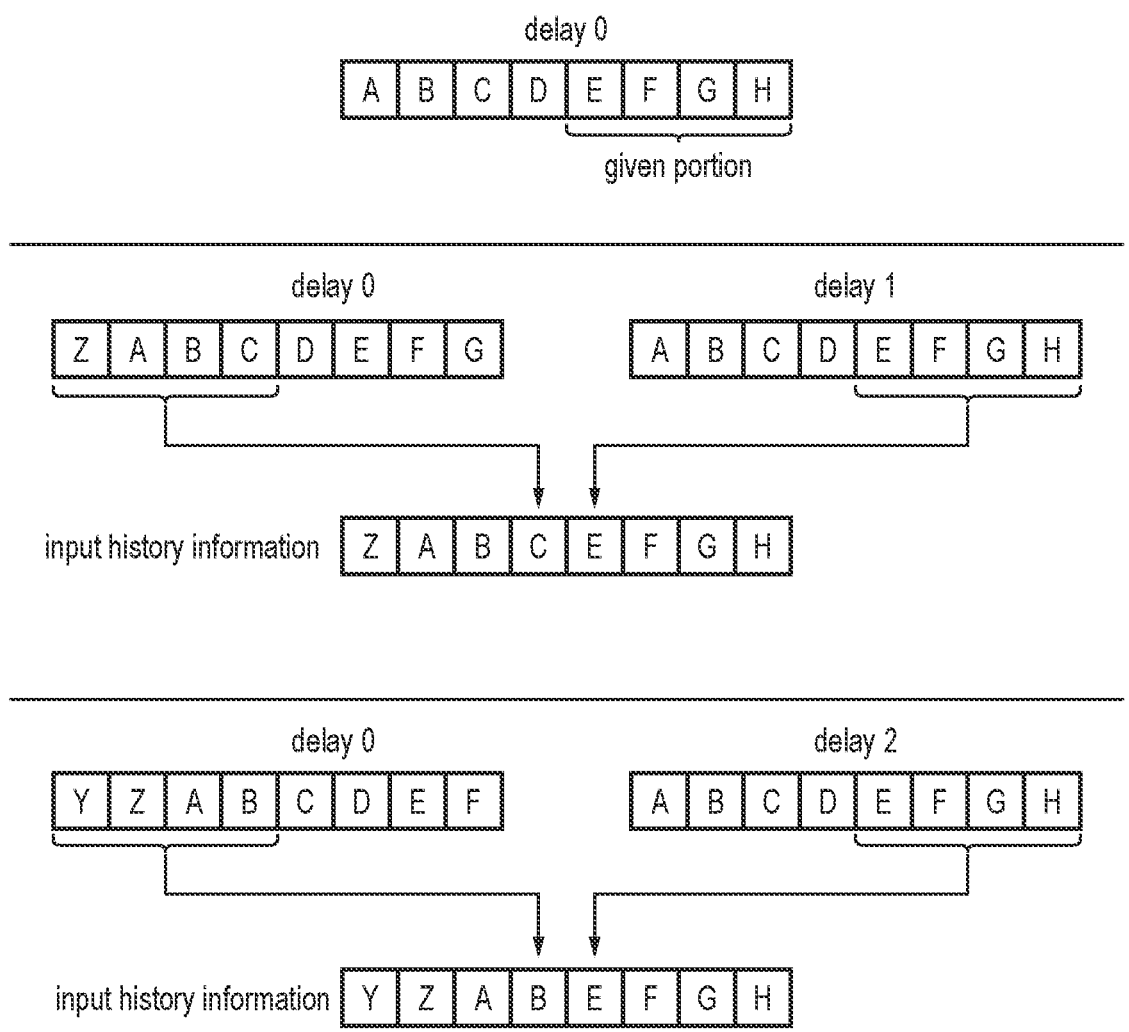
FIG. 7 illustrates a process of injecting snapshots of a given portion of history information into input history information.

The input history selection circuitry 6 may use the snapshot circuitry to prevent sections of the input history information from differing even when the history storage circuitry is not prevented from updating, as shown in FIG. 7.

FIG. 7 shows the contents of the history storage circuitry at three different times, with the history storage circuitry being updated once between each time.

In the top portion of FIG. 7, history information stored in the history register takes the series of values ABCDEFGH. Based on filtering information associated with all instructions, or one instruction in particular, the input history selection circuitry 6 determines that the top four values EFGH form the given portion which is not used to generate table lookup information for an active table, and therefore the given portion of the information input into the lookup information generating circuitry 8 should be prevented from differing to reduce unnecessary toggling.

In the middle portion of FIG. 7, the history storage circuitry 4 has been updated (by insertion of a new value Z) and updates for the given portion have not been disabled. While FIG. 7, for ease of understanding, shows the history storage as a true shift register with the insertion of Z causing each other entry to move up one place in the shift register, this is not essential and other examples could implement the history storage as a circular buffer. If the history information were directly input into the lookup information generating circuitry 8, then the given portion changing from "EFGH" to "DEFG" would cause several input lines to change value and therefore cause toggling. The input history selection circuitry 6 therefore injects modified history values for the given portion to prevent toggling. The values which should be injected are "EFGH". The input history selection circuitry 6 has access to a delayed copy of the history information in the snapshot delayed by 1 input. Therefore, the input history selection circuitry 6 injects the given portion (the top four values) of the delayed history information from the instance of snapshot circuitry applying a 1-update delay into the history information to be input into the predictor (taking the other values from the history storage circuitry as usual), so the input history information overall is ZABCEFGH. This means that the given portion EFGH remains unchanged, whilst the rest of the input history information is up-to-date and can be used to generate accurate table lookup information to make a prediction.

The bottom portion of FIG. 7 shows the input history information after the next history information update (insertion of a new value Y). Now the desired portion of the given portion ("EFGH") forms the top four bits of the snapshot delayed by two cycles (the snapshot delayed by 1 cycle is not shown), and therefore the input history selection circuitry 6 injects the given portion from the instance of the snapshot circuitry applying a 2-update delay. This continues using snapshots from increasingly delayed versions of the history information until either the given portion changes due to the selection of active tables changing, or until there are no further instances of delayed history values provided by the snapshot circuitry, at which point the given portion may need to change. Larger maximum delays may be associated with larger power gains. In one example, if the maximum delay supported is 2 cycles, this may be associated with a maximum theoretical power gain of ½, whereas a maximum delay of 4 cycles may be associated with a maximum power gain of ¾.

It may appear unusual to use increasingly delayed snapshots of the given portion rather than, for example, storing the desired values of the given portion in a register and reading from the register each time. However, a predictor is one of the elements of a processor for which timing is most important, and the inventors have determined that the use of snapshot circuitry as described above is one of the ways to meet the strict timing requirements for a predictor. Techniques based on retrieving some information from storage, for example, can be less likely to meet timing requirements.

Figure 8:
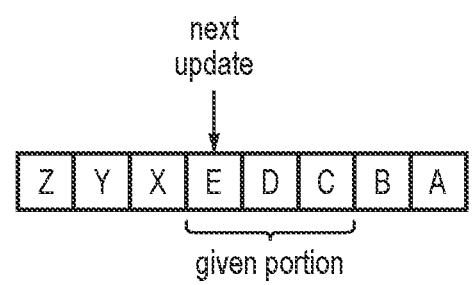
FIG. 8 illustrates a circular buffer.

FIG. 8 shows an example of a circular buffer, which may be one example of history storage circuitry 4. Each element of the circular buffer stores a value corresponding to a processing event. A pointer is maintained which identifies which element of the circular buffer is the next element to be updated, overwriting the previous values of that element. Unlike the shift register the circular buffer does not move each element every time it is updated, meaning that the given portion (representing the oldest X values of history information) moves each time the history storage circuitry is updated. The history storage circuitry cannot therefore be power gated to prevent updates to the given portion. This means that the injection of values using snapshot circuitry as shown in FIG. 7 is particularly suitable for implementations using a circular buffer as history storage circuitry 4.

Figure 9:
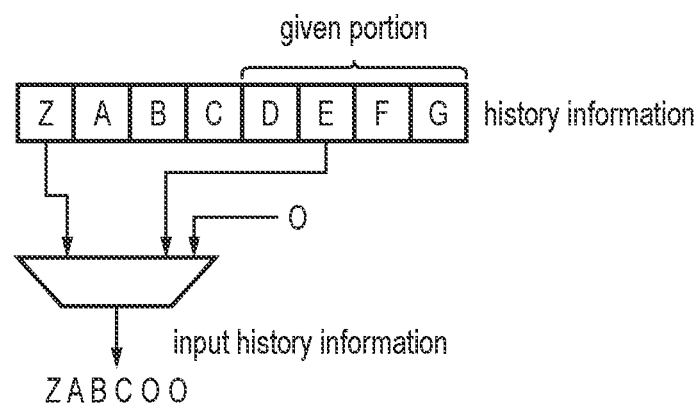
FIG. 9 illustrates a process of injecting a predetermined value into a given portion of input history information.

FIG. 9 shows another example of injecting values into the input history information to prevent updates to the given portion, even when the history storage circuitry 4 is allowed to update. In the example of FIG. 9, the history information is stored in a shift register, and the input history information is selected based on the 6 most recent values. The top four values in the history storage circuitry are treated as the given portion, meaning that their values should not change.

In the example of FIG. 9, the given portion is prevented from changing by replacing the given portion with all zeros. A multiplexer selects elements from the history storage circuitry to be used as input history information, and the values which correspond to the given portion are replaced with zero. Hence, the input history information in one cycle may read "ABCD00" and in the next "ZABC00", meaning that the given portion does not change.

This option is suited more to examples where the given portion remains the same between predictions. If the next prediction used the $5^{th}$ and/or $6^{th}$ elements of the history information, then the input values would have to change from 0 to their normal values, causing a large number of input lines to change value and toggle logic, whereas changing from previous values may be associated with less toggling. The technique saves power by minimising change on the input lines. Changing input values of the given portion to zero for one or two cycles may not be associated with power saving because changing to zeros may itself cause toggling (use of snapshot circuitry as described above would be better in this situation), but holding the input values at zero over many cycles may be associated with power saving due to reduced toggling, and hence the selection of which technique to use may be dependent on use case. Nevertheless, for examples such as a TAGE predictor in use cases where the inactive subset of prediction tables remains relatively constant (e.g. where the inactive subset of prediction tables is defined globally for all predictions, e.g. based on the longer-history tables not having been allocated for any valid entries yet), then this approach of injecting a fixed value such as zero can help to reduce toggling of input history information even if the history storage itself does toggle (e.g. due to a circular buffer implementation for the history storage 4 that means that the location of the "given portion" varies so that it is difficult to suppress updates to the history storage itself).

Figure 10:
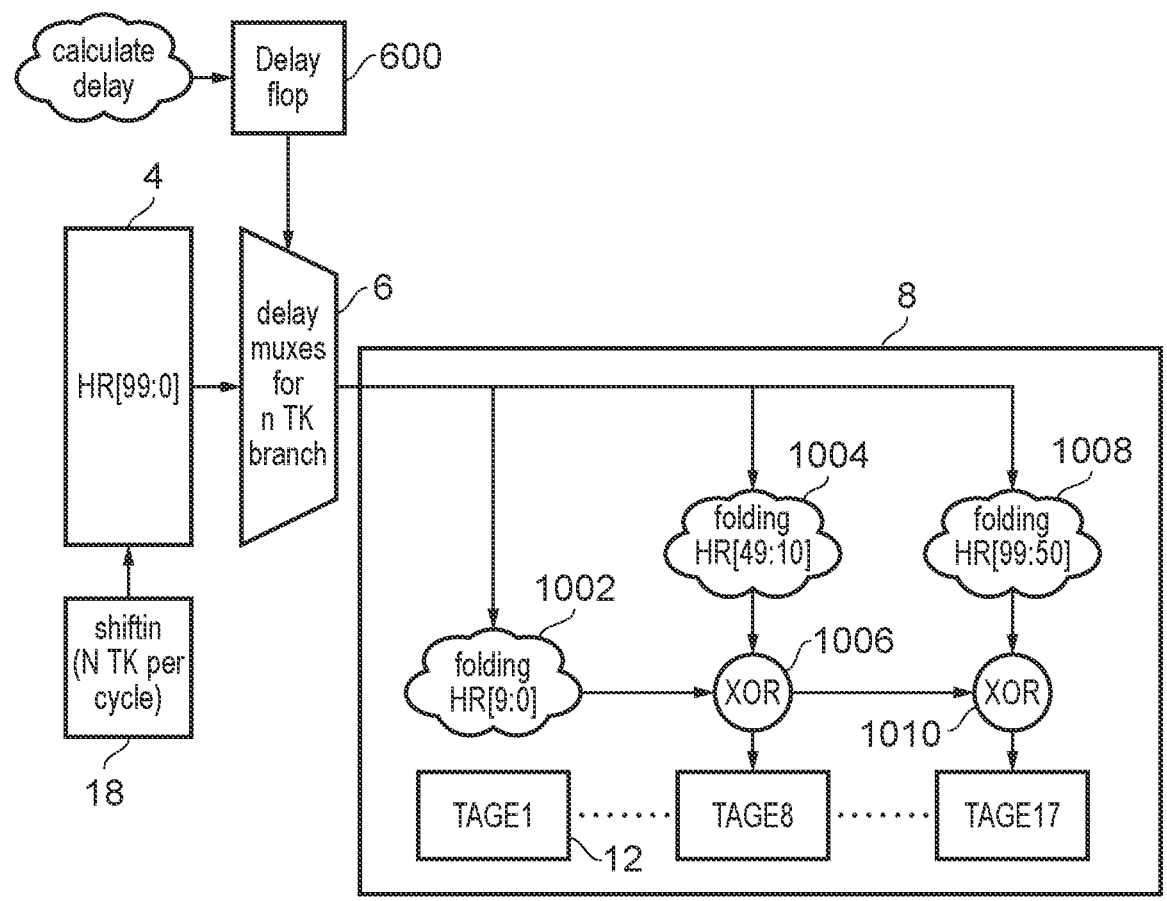
FIG. 10 illustrates a further example of a predictor.

FIG. 10 shows an example of a TAGE predictor, showing an example of the lookup information generating logic 8 in greater detail. Features which are labelled the same as earlier features can be taken to be the same as described earlier.

The lookup information generating circuitry 8 comprises folding logic 1002. The folding logic is configured to perform a hash function (e.g., a series of XOR operations) on sections of history information input from the history register 4. A first instance of folding logic 1002 combines the most recent 10 bits of history information (HR [9:0]) to provide a hash for looking up a first prediction table 12 TAGE1.

Subsequent prediction tables are looked up based on longer lengths of history information. For example, the later table TAGE8 may be looked up based on the most recent 50 bits of history. Folding logic 1004 therefore combines bits [49:10] of the history register to provide a hash, and combining logic 1006 combines the hash generated by the earlier folding logic 1002 with the hash generated by folding logic 1004, to provide lookup information for table TAGE8.

Similarly, table TAGE17 is looked up based on all 100 bits [99:0] of the history register 4. Therefore, the lookup generation circuitry comprises folding logic 1008 which combines bits [99:50] and then combining logic 1010 to combine this hash with the hash generated by earlier combining logic 1006.

In some examples, tables TAGE9 to TAGE17 may be inactive. Hence, there is no need to generate table lookup information using bits [99:50] of the history register, because these bits form no part of the information used for looking up tables TAGE1 and TAGE8. By preventing bits [99:50] from changing values, then the logic 1008 can be prevented from toggling and therefore power can be saved.

It will be appreciated that the specific numbers of bits of history information described in FIG. 10 are not limiting, and different numbers of bits of history information could be used with the present technique.

Figure 11:
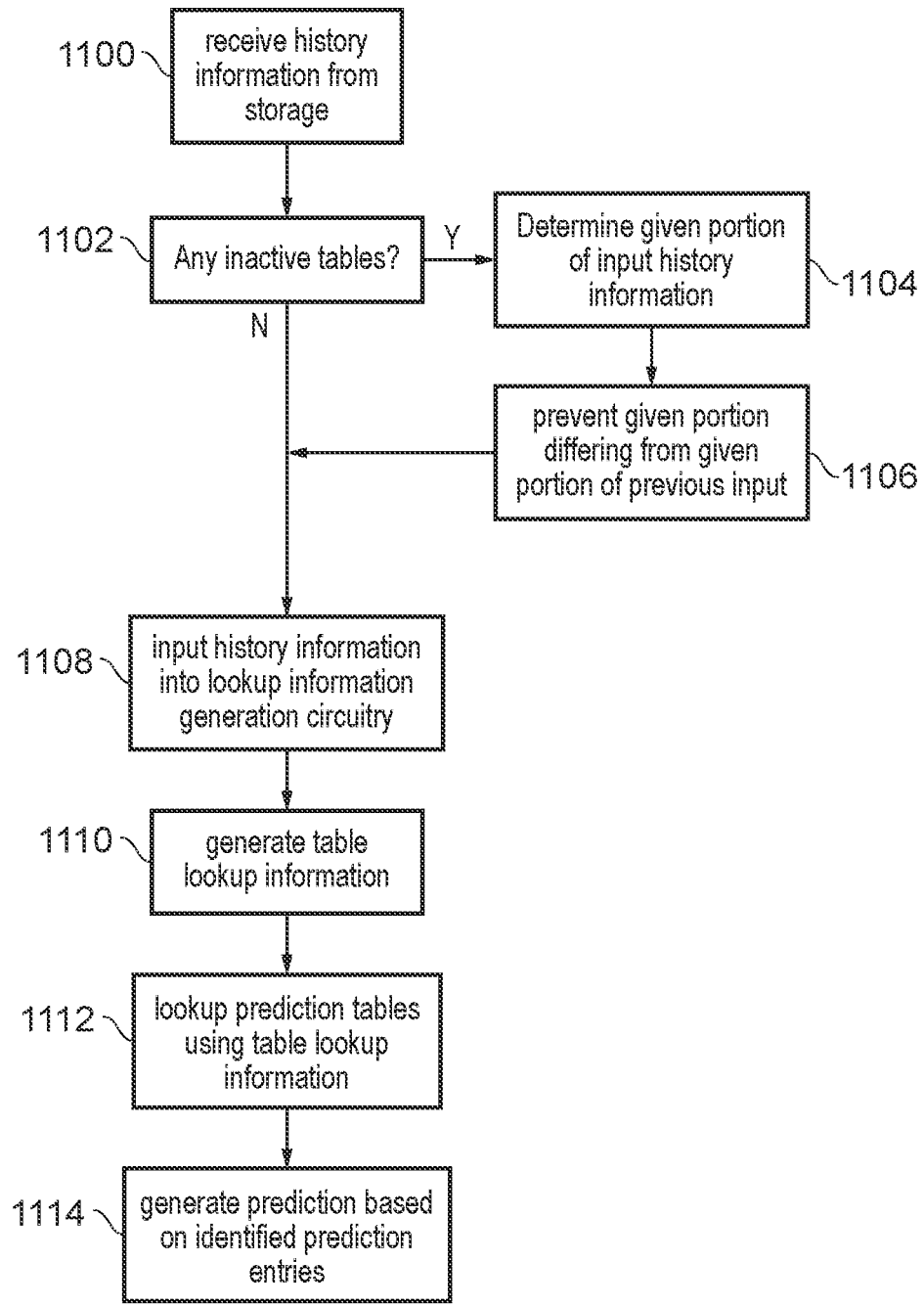
FIG. 11 is a flow diagram illustrating a process of making a prediction using a predictor.

FIG. 11 is a flow diagram showing a method of using a predictor to make a prediction. At step 1100 history information is received from history storage circuitry 4. At 1102, input history selection circuitry 6 determines whether any of the plurality of prediction tables 12 are to be treated as inactive. If not, then the process continues to step 1108 where the history information received from the history storage circuitry 4 is used as input history information into the lookup information generation circuitry 6, which at step 1110 is used to generate table lookup information for the plurality of prediction tables 12. At step 1112, the plurality of prediction tables 12 are looked up by lookup circuitry 10 using the table lookup information, and at step 1114 prediction information stored in prediction entries identifies by the lookups is used by prediction generating circuitry 14 to provide a prediction.

If, at step 1102, the input history selection circuitry 6 determines that there is at least one inactive table, then at 1104 the selection of active tables is used to determine the given portion of the input history information, where the given portion is a portion which is not used to generate table lookup information for the active tables, and therefore the given portion of the input history information can remain unchanged to reduce power consumption. At step 1106, therefore, the input history selection circuitry prevents the given portion from differing from the input values currently taken by the given portion. For example, if the inactive tables were never active then the given portion has never been used for a prediction and therefore may remain zero (e.g., by injecting zeros for the given portion). If the given portion has previously been used in a prediction, the given portion may be caused to have its previous value by preventing updates to the given portion of the history register or by injecting the given portion from snapshot circuitry, for example. In any case, at step 1108 the input history information is input into the lookup information generating circuitry 8 with the given portion not changing from a previous value. The following steps take place as discussed above.

Figure 12:
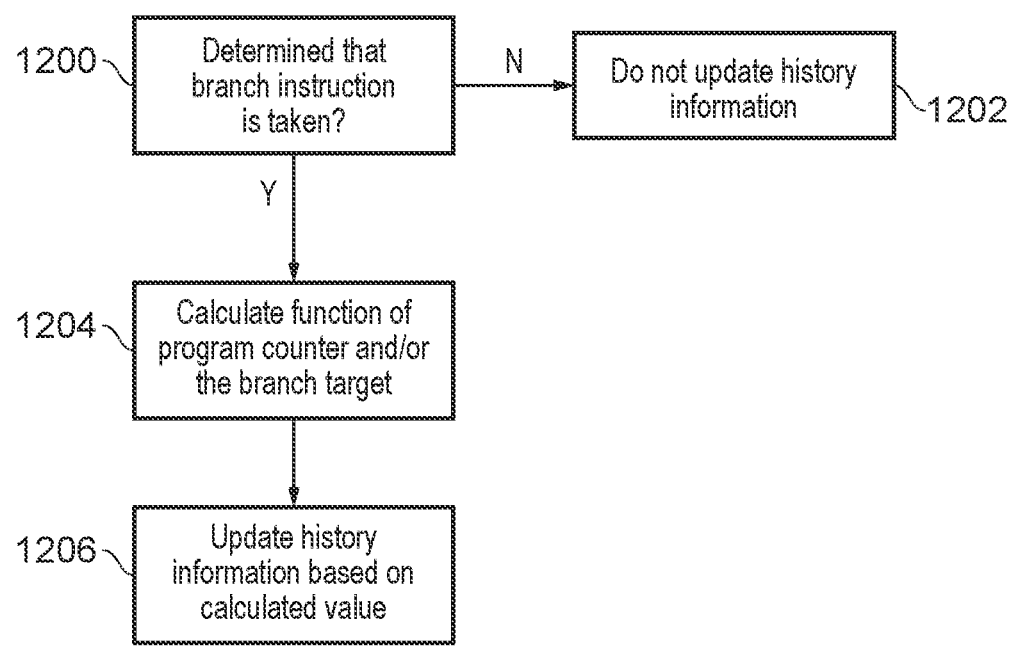
FIG. 12 is a flow diagram illustrating a process of updating history information.

FIG. 12 is a flow diagram showing a method of updating the history information stored in the history storage circuitry 4. At step 1200 it is determined whether a branch instruction is taken. This determination may be made at the prediction stage, for example, meaning that the branch instruction is predicted to be taken. If the instruction at the prediction stage is not a branch instruction, or is a branch instruction but is predicted to be not taken, then at step 1202 the history information is not updated for that instruction.

If a branch instruction is predicted to be taken, then at step 1204 a function is calculated of the address of the branch instruction (which may be indicated by the program counter depending on the stage in a pipeline at which the update is made) and/or the target address of the branch. The particular function is not particularly important, as long as the result is related to the input values, meaning that different paths through processing lead to different history values being generated. At step 1206 the history storage circuitry 4 is updated by update circuitry 18 based on the calculated value. This may involve shifting the previous values of the history storage circuitry (other than those which form part of a given portion for which updates are disabled).

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 13:
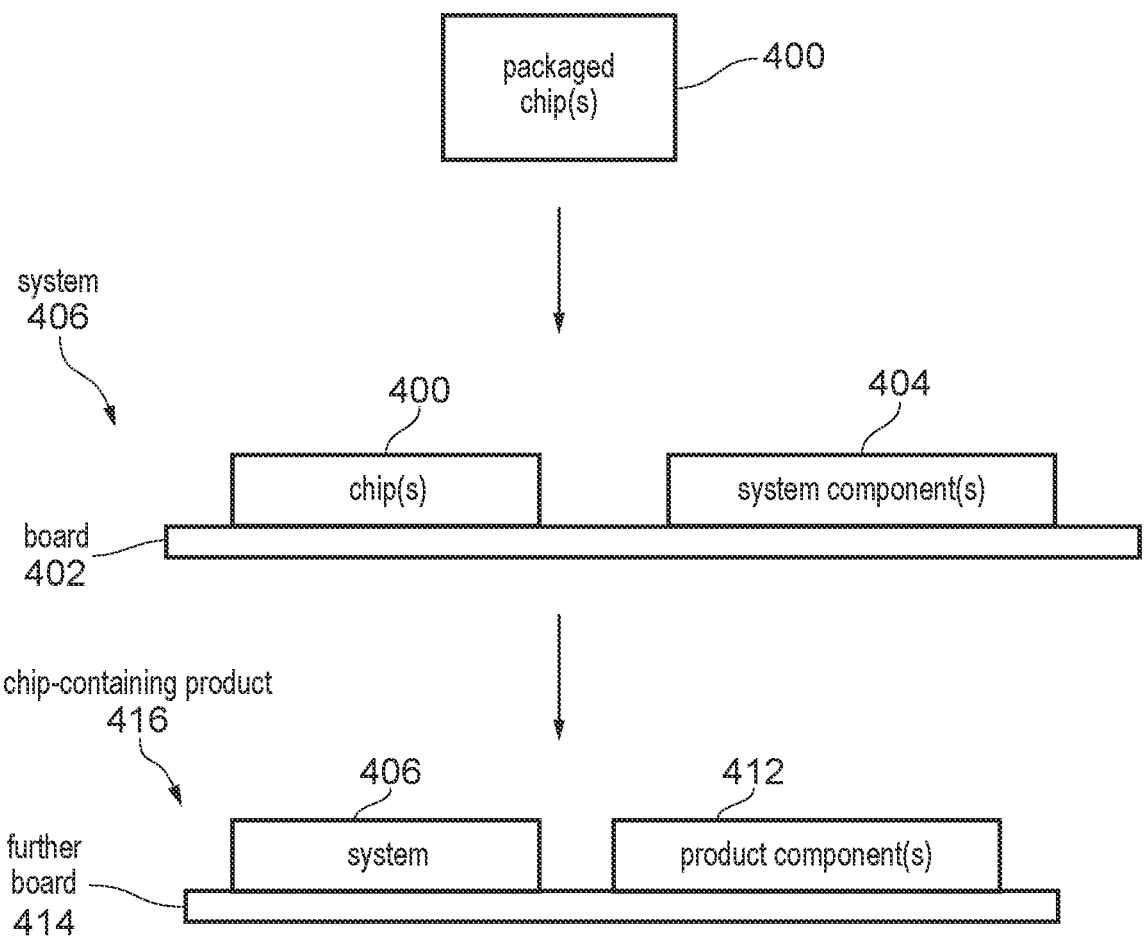
FIG. 13 illustrates a system and a chip-containing product.

As shown in FIG. 13, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. portions of a complete chip which may be combined to provide the functionality of the complete chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:
(1) An apparatus, comprising:
   history storage circuitry to store history information comprising a series of values corresponding to a series of processing events to represent a path through program execution;
   a predictor to provide a prediction, the predictor comprising:
      a plurality of prediction tables to store prediction entries providing prediction information;
      lookup circuitry to perform table lookups in the plurality of prediction tables using table lookup information;
      lookup information generation circuitry to generate the table lookup information for the plurality of prediction tables based on different lengths of input history information, wherein the input history information is based on the history information stored in the history storage circuitry; and
      prediction generating circuitry to generate the prediction based on the prediction information in prediction entries identified by the lookup circuitry; and
   input history selection circuitry to prevent a given portion of the input history information input into the lookup information generation circuitry for generating the table lookup information for a given prediction from differing with respect to a corresponding portion of the input history information input into the lookup information generation circuitry for generating the table lookup information for a preceding prediction; wherein the table lookup information for looking up an active subset of the plurality of prediction tables is independent from the given portion of the input history information, and the table lookup information for looking up an inactive subset of the plurality of prediction tables is dependent on the given portion of the input history information, and the table lookup information for looking up the inactive subset of the plurality of prediction tables is based on a longer length of input history information than the table lookup information for looking up the active subset of the plurality of prediction tables.

(2) The apparatus according to clause 1, wherein the input history selection circuitry is configured to determine the active subset of prediction tables based on filtering information associated with an address subject to the given prediction.

(3) The apparatus according to any preceding clause, wherein the input history selection circuitry is configured to determine the active subset of prediction tables based on global table activity information indicating active prediction tables independent from an address which is subject to the given prediction.

(4) The apparatus according to any preceding clause, wherein the input history selection circuitry comprises power gating logic configured to disable updates for a portion of the history storage circuitry corresponding to the given portion of the input history information.

(5) The apparatus according to clause 4, wherein the history storage circuitry is a shift register, wherein responsive to an update inputting more recent history information at a newer end of the shift register, the shift register is configured to shift previous contents of the history register towards an older end of the shift register; and the power gating logic is configured to disable updates for an oldest portion of the shift register.

(6) The apparatus according to any of clauses 4 and 5, wherein the power gating logic is responsive to a prediction table activation event to re-enable updates for at least a part of the disabled portion, wherein the prediction table activation event is an event which triggers activation of a previously inactive prediction table.

(7) The apparatus according to clause 6, comprising history storage restoration circuitry responsive to the prediction table activation event to restore history information in the disabled portion from a history buffer.

(8) The apparatus according to any preceding clause, wherein the input history selection circuitry is configured to inject modified history information into the input history information downstream of the history information storage circuitry to prevent the given portion differing between the given prediction and the preceding prediction.

(9) The apparatus according to clause 8, wherein in at least one mode the modified history information has a predetermined fixed value.

(10) The apparatus according to any of clauses 8 and 9, comprising snapshot circuitry to provide a plurality of snapshots of the history information corresponding to respective points in program flow, wherein the modified history information comprises a snapshot of the given portion having the same value as the given portion took for the preceding prediction.

(11) The apparatus according to clause 10, comprising:
a first predictor to generate a first prediction in a first number of pipeline stages, based on information derived from a first snapshot of the history information; and
a second predictor to generate a second prediction in a second number of pipeline stages different to the first number, based on information derived from a second snapshot of the history information corresponding to a different point in program flow to the first snapshot.

(12) The apparatus according to any preceding clause, wherein for a given prediction table, the lookup information generation circuitry is configured to map N bits of input history information to M bits of table lookup information for the given prediction table, where M<N.

(13) The apparatus according to any preceding clause, wherein the predictor is a branch predictor to provide a predicted branch instruction outcome for a current block of at least one instruction.

(14) The apparatus according to any preceding clause, wherein the plurality of prediction tables comprise tagged-geometric (TAGE) tables; and
when the table lookup hits in at least two TAGE tables, the prediction generating circuitry is configured to generate the prediction based on a hit prediction entry in the TAGE table looked up based on table lookup information generated based on the longest length of input history information.

(15) The apparatus according to any preceding clause, wherein the history information is updated in response to detecting that a branch instruction is treated as taken.

(16) The apparatus according to any preceding clause, wherein a value of the series of values of the history information is generated in dependence on at least one of:
an instruction address of a branch instruction; and
a target address of a branch instruction.

(17) A non-transitory computer-readable medium to store computer-readable code for fabrication of the apparatus of any preceding clause.

(18) A system comprising:
the apparatus of any preceding clause, implemented in at least one packaged chip;
at least one system component; and
a board,
wherein the at least one packaged chip and the at least one system component are assembled on the board.

(19) A chip-containing product comprising the system of clause 18 assembled on a further board with at least one other product component.

(20) A method, comprising:
storing history information comprising a series of values corresponding to a series of processing events to represent a path taken through program execution;
generating table lookup information for looking up a plurality of prediction tables based on different lengths of input history information, the plurality of prediction tables storing prediction entries providing prediction information, wherein the input history information is based on the stored history information;
performing table lookups in the plurality of prediction tables using the table lookup information;
generating a prediction based on the prediction information in prediction entries identified by the table lookups; and
preventing a given portion of the input history information used for generating the table lookup information for a given prediction from differing with respect to a corresponding portion of the input history information used for generating the table lookup information for a preceding prediction; wherein the table lookup information for looking up an active subset of the plurality of prediction tables is independent from the given portion of the input history information, and the table lookup information for looking up an inactive subset of the plurality of prediction tables is dependent on the given portion of the input history information; and the table lookup information for looking up the inactive subset of the plurality of prediction tables is based on a longer length of input history information than the table lookup information for looking up the active subset of the plurality of prediction tables.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
   history storage circuitry configured to store history information comprising a series of values corresponding to a series of processing events to represent a path through program execution;
   a predictor configured to provide a prediction, the predictor comprising:
      a plurality of prediction tables to store prediction entries providing prediction information;
      lookup circuitry configured to perform table lookups in the plurality of prediction tables using table lookup information;
      lookup information generation circuitry configured to generate the table lookup information for the plurality of prediction tables based on different lengths of input history information, wherein the input history information is based on the history information stored in the history storage circuitry; and
      prediction generating circuitry configured to generate the prediction based on the prediction information in prediction entries identified by the lookup circuitry; and
   input history selection circuitry configured to prevent a given portion of the input history information input into the lookup information generation circuitry for generating the table lookup information for a given prediction from differing with respect to a corresponding portion of the input history information input into the lookup information generation circuitry for generating the table lookup information for a preceding prediction; wherein the table lookup information for looking up an active subset of the plurality of prediction tables is independent from the given portion of the input history information, and the table lookup information for looking up an inactive subset of the plurality of prediction tables is dependent on the given portion of the input history information, and the table lookup information for looking up the inactive subset of the plurality of prediction tables is based on a longer length of input history information than the table lookup information for looking up the active subset of the plurality of prediction tables.

2. The apparatus according to claim 1, wherein the input history selection circuitry is configured to determine the active subset of prediction tables based on filtering information associated with an address subject to the given prediction.

3. The apparatus according to claim 1, wherein the input history selection circuitry is configured to determine the active subset of prediction tables based on global table activity information indicating active prediction tables independent from an address which is subject to the given prediction.

4. The apparatus according to claim 1, wherein the input history selection circuitry comprises power gating circuitry configured to disable updates for a portion of the history storage circuitry corresponding to the given portion of the input history information.

5. The apparatus according to claim 4, wherein the history storage circuitry is a shift register, wherein responsive to an update inputting more recent history information at a newer end of the shift register, the shift register is configured to shift previous contents of the shift register towards an older end of the shift register; and
   the power gating circuitry is configured to disable updates for an oldest portion of the shift register.

6. The apparatus according to claim 4, wherein the power gating circuitry is responsive to a prediction table activation event to re-enable updates for at least a part of the disabled portion, wherein the prediction table activation event is an event which triggers activation of a previously inactive prediction table.

7. The apparatus according to claim 6, comprising history storage restoration circuitry responsive to the prediction table activation event to restore history information in the disabled portion from a history buffer.

8. The apparatus according to claim 1, wherein the input history selection circuitry is configured to inject modified history information into the input history information downstream of the history information storage circuitry to prevent the given portion of the input history information differing between the given prediction and the preceding prediction.

9. The apparatus according to claim 8, wherein in at least one mode the modified history information has a predetermined fixed value.

10. The apparatus according to claim 8, comprising snapshot circuitry to provide a plurality of snapshots of history information stored in the history storage circuitry at respective points in program flow, wherein the modified history information comprises a portion of one of the plurality of snapshots, the portion having the same value as the given portion of the input history information for the preceding prediction.

11. The apparatus according to claim 10, comprising:
a first predictor to generate a first prediction in a first number of pipeline stages, based on information derived from a first snapshot of the input history information; and
a second predictor to generate a second prediction in a second number of pipeline stages different to the first number, based on information derived from a second snapshot of the input history information corresponding to a different point in program flow to the first snapshot.

12. The apparatus according to claim 1, wherein for a given prediction table, the lookup information generation circuitry is configured to map N bits of input history information to M bits of table lookup information for the given prediction table, where M<N.

13. The apparatus according to claim 1, wherein the predictor is a branch predictor to provide a predicted branch instruction outcome for a current block of at least one instruction.

14. The apparatus according to claim 1, wherein the plurality of prediction tables comprise tagged-geometric (TAGE) tables; and
when the table lookup hits in at least two TAGE tables, the prediction generating circuitry is configured to generate the prediction based on a hit prediction entry in the TAGE table looked up based on table lookup information generated based on the longest length of input history information.

15. The apparatus according to claim 1, wherein the history information is updated in response to detecting that a branch instruction is treated as taken.

16. The apparatus according to claim 1, wherein a value of the series of values of the history information is generated in dependence on at least one of:
an instruction address of a branch instruction; and
a target address of a branch instruction.

17. A non-transitory computer-readable medium to store computer-readable code for fabrication of the apparatus of claim 1.

18. A system comprising:
the apparatus of claim 1, implemented in at least one packaged chip;
at least one system component; and
a board,
wherein the at least one packaged chip and the at least one system component are assembled on the board.

19. A chip-containing product comprising the system of claim 18 assembled on a further board with at least one other product component.

20. A method, comprising:
storing history information comprising a series of values corresponding to a series of processing events to represent a path taken through program execution;
generating table lookup information for looking up a plurality of prediction tables based on different lengths of input history information, the plurality of prediction tables storing prediction entries providing prediction information, wherein the input history information is based on the stored history information;
performing table lookups in the plurality of prediction tables using the table lookup information;
generating a prediction based on the prediction information in prediction entries identified by the table lookups; and
preventing a given portion of the input history information used for generating the table lookup information for a given prediction from differing with respect to a corresponding portion of the input history information used for generating the table lookup information for a preceding prediction; wherein
the table lookup information for looking up an active subset of the plurality of prediction tables is independent from the given portion of the input history information, and the table lookup information for looking up an inactive subset of the plurality of prediction tables is dependent on the given portion of the input history information; and
the table lookup information for looking up the inactive subset of the plurality of prediction tables is based on a longer length of input history information than the table lookup information for looking up the active subset of the plurality of prediction tables.

* * * * *